United States Patent

[11] 3,601,094

[72] Inventor Ziro Kittaka
 719, Higashikata, Ibusuki-shi, Kagoshima-ken, Japan
[21] Appl. No. 777,189
[22] Filed Nov. 19, 1968
[45] Patented Aug. 24, 1971
[32] Priority Nov. 22, 1967
[33] Japan
[31] 42/75034

[54] ARTIFICIAL PRODUCTION OF THE YOUNG OF COASTAL CRUSTACEA
 7 Claims, No Drawings
[52] U.S. Cl. ................................................. 119/2
[51] Int. Cl. ............................................. A01k 61/00
[50] Field of Search .......................................... 119/2, 3

[56] References Cited
 UNITED STATES PATENTS
 3,158,135 11/1964 Kimmerle ..................... 119/3
 3,473,509 10/1969 Miyamura ..................... 119/2

OTHER REFERENCES

Cook, H. L. U.S. Fish & Wildlife Service Circular No. 268, Page 7, Bu. of Commercial Fisheries, Biological Lab., Galveston, Texas Fy 1966 - " Identification & Culture of Shrimp Larvae" 119-2

Cook, H. L and M. A. Murphy " The Culture of Larval Penaeid Shrimp" Bu. of Commercial Fisheries Biological Lab., Paper presented at American Fisheries Society Meeting, Sept. 1968 Tucson Ariz., Reprinted from Transactions of The American Fisheries Society Vol. 98, No. 4, Oct. 1969 pp. 751–754 119-2

Ewald, Joseph J. " The Laboratory Rearing of Pink Shrimp Penaeus Duoraum" Bulletin of Marine Science Vol. 15, 1965, Numbers 1–4 Issued 1965 Page 441 University of Miami Press, Coral Gables, Fla. 119-2

Motosaku Hudinaga and Mitsutake Miyamura, " Breeding of' Kurma Prawn' Penaeus Japonicus Bate" Translated from Journal of the Oceanographical Society of Japan 20th Anniversary Vol., 1962, by Yosuka Hirono, pp. 10, 11 119-2

Motosaku Hudinaga, " Reproduction, Development and Rearing of Penaeus Japonicus Bate" National Research Council of Japan, Japanese Journal of Zoology Vol. X No. 2 Tokyo July 20, 1942 Reproduction, Development and Rearing of Penaeus Japonicus Bate Page 371 Translation in 119/2

Motosaku Hudinaga and Ziro Kittaka, Japan Plank-to-logical Research Liaison Assoc. Information Bulletin No. 13 of 1966, "Studies on Food and Growth of Larval Stage of a Prawn, Penaeus Japonicus, with Reference to the Application to Practical Mass Culture" Translation of Pages 22 to 27 119/2

Motosaku Fujinaga (Hudinaga) " Kurma Shrimp Cultivation in Japan" Fisheries Reports No. 57, Vol. 3 Proceedings of the World Scientific Conference on Biology and Culture of Shrimps and Prawns. Mexico City, Mexico June 12-21, 1967 Pages 811, and 820 to 825 Translation in 119/1

Primary Examiner—Aldrich F. Medberry
Attorneys—Ernest F. Marmorek, Jordan B. Bierman and Marmorek and Bierman ABSTRACT: Larvae of a crustacean are caused to hatch and develop in a body of natural sea water into which inorganic and organic nutritive substances are added in accordance with the properties of the water, thereby inducing live food organisms required by the larvae according to their development to multiply successively in the water, whereby raising of the larvae and the culturing of food necessary for the larvae are carried out simultaneous in the same body of water under a stably maintained natural food chain.

3,601,094

ARTIFICIAL PRODUCTION OF THE YOUNG OF COASTAL CRUSTACEA

BACKGROUND OF THE INVENTION

This invention relates generally to planned, artificial cultivation of commercially valuable coastal crustacea from spawning, through hatching, and through growth to marketable sizes. Examples of these crustacea are prawns of the "kuruma" prawn species (*Penaeus japonicus* BATE) of the Penaeidae family, crabs of the "gazami" crab species (*Portunus trituberculatus* MIERS) of the Portunidae family, and spiny lobsters of the "Ise" lobster species (*Panulirus japonicus* VON SIEBOLD) of the Palinuridae family.

Since the above-mentioned crustacea in their initial larval stage are physiologically very delicate, it is the common practice to use clear sea water which has been thoroughly filtered for the culture tank water during the raising of these larvae and to install the culture tanks indoors in order to avoid the deleterious effects of direct sunlight. The success or failure of the raising of these larvae under such conditions is considered to be determined by the food given thereto in the initial period, and as a result of extensive research, raising of these larvae is being carried out at present by feeding them the following kinds of foods respectively for the successive stages of their development.

The larvae of the kuruma prawn species hatch as nauplii approximately half a day after the eggs have been spawned into sea water and metamorphose into zoea larvae approximately 1.5 days after hatching, beginning to take diatoms as food. The larvae pass through the zoea stage in 3 to 4 days to metamorphose to the mysis stage and begin to take animal plankton as food. After approximately 3 days in the mysis stage, the larvae undergo metamorphosis to the post larval stage. 4 to 5 days after this metamorphosis, the larvae progressively shift to sea bottom living, and, in approximately 1 month from spawning, become young prawns with the habit of burying themselves in sand.

Food fed to the larvae in the zoea stage is pure cultured Skeletonema costatum, a species of marine diatom. The food for the larvae through the mysis stage and first half of the post larval stage is Artemia salina immediately after hatching. The flesh of fish and mollusks are used as food for the prawns in the latter half of the post larval stage and thereafter.

The larvae of crabs of the gazami crab species hatch as zoea from external eggs adhering to the abdominal appendages of the parent crab and begin to take zooplankton as food. After 8 to ( days of the zoea stage, the larvae metamorphose to the megalopa stage, which lasts 4 to 5 days. Thereafter, the larvae metamorphose into infant crabs and, after a further 4 to 5 days, progressively shift to living on the sea bottom, becoming a young crab approximately 1 month after hatching. The food fed to the larvae during the zoea and megalopa stages is artemia, and the flesh of fish and mollusks are used as food for the infant crab stage and thereafter.

The larvae of lobsters of the Ise lobster species hatch as phyllosoma from external eggs adhering to the abdominal appendages of the parent lobster and after a period estimated to be approximately 6 to 7 months of life in a free floating state enter the puerulus stage and metamorphose to infant lobsters.

Artemia is used as food for the phyllosoma stage, and the flesh of fish and mollusks is used for the puerulus stage and thereafter.

In carrying out these conventional cultivation methods, food considered to be respectively suitable depending on the species of the crustacea and the larval development stage thereof are artificially fed, and the culturing or selective collection of the live food and the raising of the larvae are always carried out separately, suitably adjusted food being supplied into the culture tank at appropriate times.

While diatoms such as skeletonema among the above mentioned live foods are indispensable foods for the initial larval stage of prawns of the kuruma prawn species, special equipment and technique are necessary for their culture. Moreover, it is apparent that even when excellent diatoms obtained thereby are supplied into the culture tank, their physiological state deteriorates within the tank, and these diatoms sink to the tank bottom and deteriorate, whereby the state of the water deteriorates to lower the survival rate of the larvae of the desired crustacea.

Furthermore, in the culture of the desired diatoms, the common method is to isolate their seeds from natural sea water and to repeat the culturing thereof to increase progressively the quantity of the culture or is based on this procedure. However, as long as the securing of diatoms, which is of the highest importance as a basic food for raising larvae, is carried out by such a method, there is no hope of realizing mass production of young kuruma prawns meeting the requirements of a successful enterprise.

While artemia is considered to be a common food for the larvae of all important species of crustacea, it should, properly speaking, be obtained as a member of widely spread zooplankton such as copepoda or free-floating larvae of cirripedia and polychaeta. By the conventional methods, however, the securing of zooplankton (excluding artemia) requires an excessive amount of time and labor.

In contrast, artemia is readily available in large quantity as a market product. Accordingly, it has become almost a fundamental rule to feed artemia indiscriminately to all larvae in stages of development requiring zooplankton. However, when artemia is fed exclusively over a long period to larvae, their cultivation yield unavoidably drops, apparently because of malnutrition. Particularly in the case of phyllosoma larvae of the Ise lobster which live through a period of several months in a free-floating state, normal development cannot be expected with only artemia as a single kind of food.

While the flesh of fish and mollusks are fed to larvae after they have acquired the and mollusks shape, most of such fish and mollusks which are available in large quantity can also be used directly as human food, and the use of such fish and mollusks as feedstuff for larvae may give rise in the future to problems as viewed from the standpoint of effective utilization of food proteins.

Thus, by the conventional larvae raising methods, a restriction is imposed on the point of feedstuffs whereby large-scale production of young crustacea is unattainable, and commercial development of the cultivation of valuable crustacea is very difficult.

In their natural marine habitat, kuruma prawns, gazami crabs, and Ise lobsters undoubtedly depend on so-called natural foods such as plankton and bottom living fauna for their food. Accordingly, it is logical to assume that, if it were possible to cause food organisms to breed and propagate in the larvae culture tank to a concentration greatly exceeding that of the natural marine habitat, it would be possible to raise the larvae of these valuable crustacea on only the natural foods.

For culturing natural foods, it is necessary to add to sea water suitable nutrients or nutritive sources. From knowledge gained heretofore, however, the direct addition of inorganic nutritive salts imparts fatal shock to the larvae, which are physiologically very delicate, while the direct addition of organic nutritive substances contaminates the water and the bottom material, thereby impairing the larvae cultivation yield. Therefore, the addition of either of these substances is strictly prohibitive.

The standard concentrations of nitrogen and phosphorous in the culture liquid used for cultivating diatoms are of the order of 28 grams (g.) and 2 g., respectively, per metric ton (hereinafter referred to an "ton") of the culture liquid. On the other hand, according to results of analyses of natural sea water, the concentration of inorganic nitrogen is from 100 to 200 milligrams (mg.) and that of inorganic phosphorous is of the order of 15 mg. per ton of coastal sea water.

I have observed that natural sea water contains a great number of plankton such as diatoms and copepoda in spite of the fact that the concentration of nutritive salts in dissolved state in the sea water is much lower than that in an artificial culture liquid. From this observation, I have found that when inorganic nitrogen compounds and inorganic phosphorous compounds are added to natural sea water with a constant nitrogen-to-phosphorous ratio of approximately 9:1 at constant supply rates such that from 100 to 200 mg. of nitrogen and from 11 to 22 mg. of phosphorous are added per ton of sea water per day so as not to impart a shock effect to the larvae, live food organisms necessary in accordance with the development stages of the larvae are progressively grown and multiply.

These rates of addition correspond to the approximate rates of consumption per day of nitrogen and phosphorous depending on the desired propagation of the diatoms. In the standard case, the rates of addition are 180 mg. of nitrogen and 20 mg. of phosphorous per ton of sea water per day.

However, as the instances of cultivation cumulatively increased, it became apparent that only the addition of inorganic nutritive salts is insufficient for the breeding of live food organisms, particularly of diatoms which are the basic food.

For example, while diatoms such as skeletonema, stephanopyxis, and leptocylindrus which are distributed throughout sea water relatively near the coastal regions continue to propagate in some cases for relatively long periods with only the addition of inorganic nutritive salts, diatoms such as chaetoceros and bacteriastrum which are distributed over relatively off-shore waters abruptly decrease after 2 or 3 days and form a flock when inorganic nutritive salts are added, becoming worthless as food in many cases.

Furthermore, since the quality of the water changes abruptly with the decrease in the diatoms, the larvae are subjected to physiological shock, whereby the progress of cultivation thereafter becomes very poor. Deterioration of the water is indicated by an abrupt drop in the pH value of the sea water. That is, while this value is of the order of 8.4 to 8.9 when the diatoms are propagating, it drops to from 8.0 to 7.8 when the diatoms decrease.

By a method wherein inorganic nutritive salts are added in this manner, the cultivation of the larvae of crustacea in regions facing the open sea, particularly crustacea such as the lse lobster which are considered to be suited for off-shore waters, is extremely difficult if not impossible. Even in the case of coastal diatoms representable by skeletonema, the propagation of the diatoms is sometimes retarded by the addition of only inorganic nutritive salts.

Analyses of sea water indicate that one ton of natural sea water contains from 100 to 200 mg. of inorganic nitrogen as the nitrogen content, as mentioned hereinbefore, and in addition from 50 to 250 mg. of organic nitrogen.

From experience, I have found that in the case of natural sea water containing more than 200 mg. of organic nitrogen per ton of the sea water, propagation of the diatoms is observable from the start of the addition of inorganic nutritive salts, whereas in the case where the organic nitrogen content is less than 200 mg./ton, the diatoms do not propagate with the addition of only inorganic nutritive salts. However, in the latter case, also, when the organic nitrogen content is raised to 200 mg./ton by adding beforehand thereto an organic nitrogen-containing compound, the diatoms begin to multiply at the normal rate.

Furthermore, in the case wherein the nutritive salts added thereafter are only inorganic nitrogen compounds and phosphorous compounds, the propagation of the diatoms sooner or later stops, although there are differences in the period, as mentioned hereinbefore. This may be considered to be due to the lack of continuity of the effect of the inorganic nutritive salts with respect to the multiplication of diatoms although this effect is promptly effective.

Accordingly, a portion of the nitrogen quantity to be added was replaced by an organic nitrogen-containing compound which can be considered to have a continuous effect, and the simultaneous use of an inorganic nitrogen and organic nitrogen containing compounds was tested.

More specifically, with respect to sea water containing 220 mg./ton of organic nitrogen and 170 mg./ton of inorganic nitrogen, the quantity of nitrogen to be added per ton per day was selected at 180 mg./ton/day. In four experimental samples of this sea water, respectively 0, 25, 50 and 75 percent of this nitrogen quantity of 180 mg./ton/day (the quantity added during the first day was 180−(220−200)=160 mg./ton/day) consisted of an organic nitrogen-containing compound, and the remaining 100, 75, 50, and 25 percent consisted of an inorganic nitrogen compound. The variations in the propogation of micro-organisms and in the resulting pH value of the sea water were as indicated in TABLE 1. Experiment No. (1) represents the case wherein only an inorganic compound is used.

TABLE 1

| | Experiment No. | | | | | | | | | | | |
|---|---|---|---|---|---|---|---|---|---|---|---|---|
| | (1) | | | (2) | | | (3) | | | (4) | | |
| Organic nitrogen added (percent of total nitrogen added) | 0 | | | 25 | | | 50 | | | 75 | | |
| Inorganic nitrogen added (percent of total nitrogen added) | 100 | | | 75 | | | 50 | | | 25 | | |
| Additives (g./metric ton): | | | | | | | | | | | | |
| $KNO_3$ | 1.36 | | | 0.95 | | | 0.63 | | | 0.32 | | |
| Finely ground meat of asari clam [1] | 0 | | | 2.25 | | | 4.50 | | | 6.75 | | |
| $K_2HPO_4$ | 0.12 | | | 0.12 | | | 0.12 | | | 0.12 | | |
| | Diatom cells per cc. | Protozoa per cc. | pH | Diatom cells per cc. | Protozoa per cc. | pH | Diatom cells per cc. | Protozoa per cc. | pH | Diatom cells per cc. | Protozoa per cc. | pH |
| Days elapsed: | | | | | | | | | | | | |
| 0 | 150 | 45 | 8.2 | 150 | 45 | 8.2 | 150 | 48 | 8.2 | 150 | 45 | 8.2 |
| 1 | 940 | 80 | 8.2 | 1,090 | 150 | 8.2 | 1,150 | 190 | 8.2 | 950 | 170 | 8.2 |
| 2 | 3,850 | 170 | 8.3 | 3,720 | 120 | 8.3 | 2,630 | 360 | 8.3 | 1,360 | 530 | 8.2 |
| 3 | 2,150 | 730 | 8.3 | 8,350 | 360 | 8.3 | 6,340 | 540 | 8.3 | 2,560 | 2,430 | 8.3 |
| 4 | 280 | 1,020 | 8.0 | 21,360 | 730 | 8.4 | 14,320 | 1,230 | 8.4 | 7,320 | 5,620 | 8.3 |
| 5 | 250 | 1,360 | 7.9 | 32,450 | 1,720 | 8.4 | 22,790 | 2,560 | 8.4 | 10,430 | 4,390 | 8.3 |
| 6 | 320 | 1,290 | 7.9 | 53,670 | 3,560 | 8.5 | 41,350 | 3,930 | 8.5 | 15,320 | 3,940 | 8.3 |
| 7 | | | | 65,310 | 4,340 | 8.6 | 38,250 | 3,160 | 8.5 | 43,210 | 4,120 | 8.4 |
| 8 | | | | 58,750 | 5,120 | 8.7 | 63,180 | 5,320 | 8.6 | 19,690 | 2,230 | 8.4 |
| 9 | | | | 73,250 | 4,630 | 8.7 | 59,430 | 6,450 | 8.7 | 11,320 | 2,520 | 8.4 |

[1] Quantities of asari clam (short-necked clam, *Tapes Philippinarum*) added on the first day were as follows: Experiment No. (2)=1.25; Experiment No. (3)=3.50; and Experiment No. (4)=5.75, all in g./ton.

From the results shown in TABLE 1, it is apparent that, when the organic nitrogen-containing compound accounts for 75 percent of the total nitrogen to be added, this compound accumulates in the water and therefore tends to have a deleterious effect on the diatom propagation, but when the quantity is from 25 to 50 percent, the diatoms and protozoa continue to propagate over long periods, and the water quality, moreover, is stable.

In the case wherein the organic nitrogen-containing compound accounts for from 25 to 50 percent of the nitrogen to be added, there occurs the singular phenomenon wherein the propagation of the protozoa is also promoted in parallel with the propagation of the diatoms. The protozoa which propagate under such conditions are composed mostly of species which perform photosynthesis similarly as diatoms, and their propagation, moreover, is more stable than that of the diatoms. Therefore, protozoa have highly desirable characteristics without the possibility of their causing deterioration in the quality of the water.

SUMMARY OF THE INVENTION

It is an object of the present invention to utilized the above described discoveries and principles and other findings as set forth hereinafter to provide a method for artificially producing the young of commercially valuable coastal crustacea of the species enumerated hereinabove and like species in a simple and economical manner, which method is highly adaptable to large-scale production.

According to the present invention, briefly summarized, there is provided a method as stated above in which, by adding to a body of culture water substances necessary for the propagation and multiplication of micro-organisms in inorganic and organic states, a live food chain comprising:
  Additive nutritive substances
  diatoms and protozoa
  zooplanktons beginning with copepoda,
  adhering organisms such as cirripedia, and
  bottom-living organisms such as polychaeta
is established and maintained in the culture water, and larvae of the desired crustacea are caused to hatch and develop in the culture water, whereby the raising of the larvae of the desired crustacea and the culturing of the live food organisms necessary therefore are carried out simultaneously in the same culture water.

DETAILED DESCRIPTION

The nature, details, and utility of the invention, as well as the principles on which it is based, will be more clearly apparent from the following detailed description beginning with general considerations and concluding with specific examples of preferred embodiment of the invention.

In accordance with the invention, the quantities to be added of nutritive substances each corresponding to 1 mg. of nitrogen are as follows: approximately 7 mg. in the case of potassium nitrate used as an inorganic nitrogen compound; approximately 50 mg. of finely ground asari clam meat when used as an organic substance; and approximately 20 mg. in the case of squid soluble (made from autolized squid viscera). The additive quantity corresponding to 1 mg. of phosphorous is approximately 6 mg. in the case of potassium secondary phosphate.

In the case where the inorganic nitrogen concentration in natural sea water is less than 100 mg./ton, adding an inorganic nitrogen compound beforehand, similarly as in the procedure for low content of organic nitrogen, to increase the inorganic nitrogen to from 100 to 200 mg./ton may be thought to be logical. However, since inorganic nitrogen compounds have immediate effect, omission of the addition beforehand does not have a great effect on the propagation of the micro-organisms.

In the case where the organic nitrogen concentration in natural sea water is higher than 200 mg./ton and that of the inorganic nitrogen is also higher than 200 mg./ton, the addition of the additives may be started after subtracting the respective excess quantities (that is, each original quantity minus 200 mg./ton).

Furthermore, in the case where only the organic nitrogen content of natural sea water is high, the organic nitrogen decomposes to become inorganic nitrogen. Theoretically, therefore, the quantity of addition of the inorganic nitrogen compound can be reduced or addition can be discontinued at some point in time. I have found, however, that in actual practice the continuation of addition of inorganic nitrogen of the specified quantity, irrespective of the magnitude of the organic nitrogen quantity, is preferable since the propagations of the diatoms and the protozoa are thereby mutually balanced.

In each of experiments Nos. (2) and (3) indicated in Table 1, natural sea water containing 200 mg./ton of organic nitrogen, 170 mg./ton of inorganic nitrogen, and 14 mg./ton of inorganic phosphorous was used. To this sea water, in experiment No. 2, 0.95 g. of potassium nitrate, 2.25 g. of finely ground asari clam (that is, a proportion of 25 percent of organic nitrogen and 75 percent of inorganic nitrogen, an exception being the addition of 1.25 g./ton/day of finely ground asari clam on the first day), and 0.12 g. of potassium secondary phosphate were added per ton of the sea water per day as nutritive additives. In experiment No. 3, 0.63 g. of potassium nitrate, 4.50 g. of finely ground asari clam (that is, a proportion of 50 percent of organic nitrogen and 50 percent of inorganic nitrogen, an exception being the addition of 3.50 g. of the asari clam on the first day), and 0.12 g. of potassium secondary phosphate were added per ton of the sea water per day.

In each of these experiments the cultivation process was carried out under direct sunlight as air was bubbled through the sea water. From 1 to 2 days after addition of the nutritive substances, micro-organisms such as diatoms, to begin with, and chromatophoric protozoa begin to propagate. Next, from 4 to 5 days after the addition, zooplankton such as copepoda which feed on the above mentioned micro-organisms propagate. Finally, from approximately 10 days after the addition, migratory polychaeta (errantia) propagate on the water tank bottom and walls, and adhering cirripedia and sedentary polychaeta (sedentaria) spawn free floating larvae and propagate.

Accordingly, by adding the above described nutritive substances to the sea water in the culture tank from the day following hatching in the case of kuruma prawns, from approximately 5 days prior to the estimated day of hatching of the larvae in the case of gazami crabs, and from 10 to 20 days prior to the estimated hatching day of the larvae in the case of Ise lobsters, it is possible to cause the timings propagation of the live food organisms such as diatoms and other micro-organisms copepoda and other zooplankton, cirripedia, and polychaeta to coincide with the larval development stages which respectively require these food organisms.

That is, it is possible to carry out cultivation of larvae and culture of live food required therefor at the same time in the same culture tank.

The relationship between the addition of nutritive substances in the above described manner and the propagation of the live food organisms produced in the culture tank by that addition and the development stages of the crustacean larvae is summarily indicated in TABLE 2. Thus, a feature of the invention is that it affords effective reproduction and maintenance in a sea water tank of a natural food-chain process which normally occurs in a natural oceanic environment.

TABLE 2

| Days after start of addition of nutritive substances | Start of propagation of live food organisms | Kuruma prawn (*Penaeus japonicus*) | | Gazami crab (*Portunus trituberculatus*) | | Ise lobster (*Panulirus japonicus*) | |
|---|---|---|---|---|---|---|---|
| | | Larval development stage | Necessary food | Larval development stage | Necessary food | Larval development stage | Necessary food |
| −2 | | | | | | | |
| −1 | | E | N−1 | E | | E | |
| 0 | | | N−2 | E | | E | |
| | | | | E | | E | |

TABLE 2—Continued

| Days after start of addition of nutritive substances | Start of propagation of live food organisms | Kuruma prawn (Penaeus japonicus) | | Gazami crab (Portunus trituberculatus) | | Ise lobster (Panulirus japonicus) | |
|---|---|---|---|---|---|---|---|
| | | Larval development stage | Necessary food | Larval development stage | Necessary food | Larval development stage | Necessary food |
| 1 | Diatoms, protozoa | Z-1 | Diatoms | E | | E | |
| 2 | do | Z-2 | do | E | | E | |
| 3 | do | Z-3 | do | E | | E | |
| 4 | Copepoda | Z-4 | do | E | | E | |
| 5 | do | M-1 | Zooplankton | Z-1 | Zooplankton | E | |
| 6 | do | M-2 | do | Z-2 | do | E | |
| 7 | do | M-3 | do | Z-3 | do | E | |
| 8 | do | P-1 | do | Z-4 | do | E | |
| 9 | do | P-2 | do | Z-5 | do | E | |
| 10 | Cirripedia, polychaeta | P-3 | do | Z-6 | do | E | |
| 11 | do | P-4 | do | Z-7 | do | E | |
| 12 | do | P-5 | Bottom habitating organisms | Z-8 | do | E | |
| 13 | do | P-6 | do | MG-1 | do | E | |
| 14 | do | P-7 | do | MG-2 | do | E | |
| 15 | do | P-8 | do | MG-3 | do | E | |
| 16 | do | P-9 | do | MG-4 | do | PH-1 | Zooplankton. |
| 17 | do | P-10 | do | P-1 | do | PH-2 | Do. |
| 18 | do | P-11 | do | P-2 | Bottom habitating organisms | PH-3 | Do. |
| 19 | do | P-12 | do | P-3 | do | PH-4 | Do. |
| 20 | do | P-13 | do | P-4 | do | PH-5 | Do. |
| 20 | | P-13 | | P-4 | do | PH-6 | Do. |
| 20 | | P-13 | | P-4 | | | |
| 20 | | P-13 | | P-4 | | | |
| 20 | | P-13 | | P-4 | | | |

Note: Symbols used above for larval development stages—E: eggs; N: nauplius; Z: zoea; M: msis; P: post larva; MG: megalopa; PH: phyllosoma; Each of the numerals after these symbols indicates the consecutive days counting from the time of metamorphosis to the indicated development stage.

In order to indicate still more fully the nature and utility of the invention, the following specific examples of preferred embodiment thereof are set forth, it being understood that these examples are presented as illustrative only and that they are not intended to limit the scope of the invention.

Example 1.

Raw sea water containing 180 mg. of inorganic nitrogen and 120 mg. of organic nitrogen per ton thereof was filtered by means of 60-mesh synthetic fiber fabric to remove coarse solid particles and then supplied to a depth of 0.4 meter (m.) in an outdoor water tank of a length of 2 m., width of 1.5 m., and depth of 0.5m. A mature female "futomizo" prawn (Penaeus latisulcatus KISHINOUYE), which is one of the kuruma prawn species and had never been raised through the larval stages, was placed in the sea water in the tank and caused to spawn, being removed from the tank immediately after spawning.

Then, as the water was aerated by bubbling air therethrough, cultivation of live food organisms and raising of larvae of the futomizo prawns were carried out simultaneously in the same tank in the following manner. On the day when the larvae hatched as nauplius, 4.8 g. of finely ground asari clam meat was supplied into the tank. For 21 days prior to the metamorphosis to the zoea stage, 2.7 g. of finely ground asari clam meat, 1.13 g. of potassium nitrate (i.e., additive proportion of 25 percent of organic nitrogen and 75 percent of inorganic nitrogen), and 0.14 g. of potassium secondary phosphate were supplied daily into the tank water.

The culture water was not changed until the elapse of approximately 14 days after metamorphosis of the futomizo prawn larvae to the post larval stage. Thereafter, approximately one fifth of the total water quantity was removed daily from the tank, which was then replenished with the same quantity of fresh sea water.

From the day when the prawn larvae metamorphosed to the zoea stage, various diatoms began to propagate in the culture water, and the zoea larvae began to feed in a very favorable manner according to plan. The culture water constantly exhibited brown color because of the propagation of the various diatoms, and the larvae did not suffer any deleterious effects even under direct sunlight and satisfactorily passed through 4 days of the zoea stage and 3 days of the mysis stage.

With a delay of a number of days after the multiplication of the diatoms, multiplications of zooplankton such as copepoda to feed on these diatoms started. Furthermore, as the accumulation on the tank bottom of diatoms which had physiologically weakened increased, numerous bottom habitating organisms which feed on these diatoms began to multiply. Copepoda and bottom habitating organisms were fully utilized as food by the prawn larvae in the post larval stage of free floating life and bottom habitating life.

In this manner, by merely adding nutritive substances to the culture water without any special supplementing of food, it was possible to produce 53,600 infant futomizo prawns (44,700 prawns per ton). This was the first instance of success in the production of infant futomizo prawns.

Example 2.

Raw sea water containing 150 mg. of inorganic nitrogen and 180 mg. of organic nitrogen per ton thereof was filtered by means of a 60- to 100-mesh synthetic fiber fabric to remove coarse solid particles and supplied to a depth of 1.5m. in each of several water tanks each measuring 20 m. ×5 m. ×2 m. (depth) and covered by corrugated vinyl sheets which were highly transparent to sunlight. From 30 to 50 mature female kuruma prawns (Penaeus japonicus BATE) were placed in each tank and caused to spawn.

Then, as air was caused to bubble through the water, cultivation of live food organisms and raising of kuruma prawn larvae were carried out simultaneously in the same tank in the following manner. On the day when the larvae hatched as nauplius 60 g. of squid soluble adsorbed on diatomaceous earth was supplied to each tank. For 50 days from the day before metamorphosis to the zoea stage, 270 g. of squid soluble, 95 g. of potassium nitrate (i.e., additive proportion of 50 percent of organic nitrogen and 50 percent of inorganic nitrogen), and 18 g. of potassium secondary phosphate were supplied daily to each tank.

The culture water was not changed until the elapse of approximately 7 days after metamorphosis of the kuruma prawn to the post larval stage. Thereafter, approximately one fifth of the total water quantity was removed daily and replaced by the same quantity of fresh sea water.

The propagation of the live food organisms was similar to that described in Example 1, and the prawn larvae satisfactorily passed through the zoea stage in from 3 to 4 days with a yield of 83 percent and the mysis stage in three days with a yield of 80 percent. The yield of the 20 days of the post larval stage was 85 percent, and the overall yield for the larval development from the nauplius stage to the infant prawn stage was 48 percent, which result is very good.

In this manner, it was possible to produce with great ease infant prawns in large quantity of an average of 860,000 prawns per water tank of a surface area of 100 m². and depth of 2 m.

While no supplementary food was especially supplied to the culture water in the period up to the metamorphosis to the post larval stage except for the addition of the nutritive substances, the food supplementarily fed to the larvae in the post larval stage and thereafter were (on the average per tank) 1.8 kg. of artemia dried eggs and 48 kg. of asari clam meat. These quantities of artemia and asari clam meat are small, being approximately 20 to 50 percent, respectively, of those required by hitherto known methods.

The results of the above described experimental production of prawns are indicated in Table 3.

TABLE 3

|  | EXPERIMENT NO. | | | |
| --- | --- | --- | --- | --- |
|  | 1 | 2 | 3 | 4 |
| Number of nauplius hatched ($\times 10^3$) | 1,250 | 1,650 | 1,800 | 2,450 |
| Number of zoea larvae ($\times 10^3$) | 1,200 | 1,450 | 1,300 | 2,100 |
| Number of mysis larvae ($\times 10^3$) | 940 | 1,250 | 1,280 | 1,560 |
| Number of post larval prawns ($\times 10^3$) | 900 | 1,050 | 1,160 | 930 |
| Infant prawns produced ($\times 10^3$) | 853 | 804 | 952 | 831 |
| Yield from nauplius through infant prawn stage (%) | 68 | 51 | 53 | 33 |
| Artemia dried eggs fed (kg.) | 1.6 | 1.6 | 2.0 | 2.0 |
| Asari clam meat fed (kg.) | 44.0 | 44.0 | 52.0 | 52.0 |

By the conventional method in which the raising of the larvae and the cultivation of the live food are carried out separately, approximately $10 \times 10^3$ infant prawns are produced from a culture tank of standard size of a volume of approximately 2 tons when the result is good. With respect to these prawns thus produced, the following foods are fed.

Cultured skeletonema

| (Quantity/day) | × | (Days fed) (zoea 4 days) (mysis 3 days). | = | Total quantity |
| --- | --- | --- | --- | --- |
| 0.15 ton | × | (4+3) days | = | 1.05 ton |

Artemia dried eggs

| (Quantity/day) | × | (Days fed) (mysis 3 days) (post larval, 4 days). | = | |
| --- | --- | --- | --- | --- |
| 10 g. | × | 3 days | = | 30 g. |
| 20 g. | × | 4 days | = | 80 g. |
| Total | | | | 110 g. |

Asari clam meat

| (Quantity/day) | × | (Days fed) (post larval, from 4th to 11th day). | = | |
| --- | --- | --- | --- | --- |
| 40 g. | × | 8 (post larval, from 12th to 20th day). | = | 320 g. |
| 80 g. | × | 9 | = | 720 g. |
| Total | | | | 1,040 g. |

By the method of the present invention, the quantities of supplementary foods necessary for producing $10 \times 10^3$ infant prawns are as follows.

Cultured skeletonema:  0 ton
Artemia dried eggs:

$$1.8 \text{ kg.} \times \frac{10 \times 10^3}{860 \times 10^3} = 21 \text{ g.}$$

Asari clam meat:

$$48 \text{ kg.} \times \frac{10 \times 10^3}{860 \times 10^3} = 558 \text{ g.}$$

That is, these quantities in relation to those required by the conventional method are as follows.

Artemia: $(21/110) \times B100 = 20$ percent
Asari meat: $(558/1040) \times 100 = 50$ percent Example 3.

Raw sea water containing 160 mg. of inorganic nitrogen and 150 mg. of organic nitrogen per ton thereof was filtered through 60-mesh synthetic fiber fabric to remove coarse solid particles and supplied to a depth of 1.5 m. in an outdoor, uncovered water tank measuring 20 m. ×5 m. ×2 m. depth. A female gazami crab (Portunus trituberculatus MIERS) which had spawned eggs and was carrying the eggs in a cluster against its abdominal region was placed in the tank.

Then, as air was bubbled through the tank water, cultivation of live food organisms are raising of the crab larvae were carried out simultaneously in the same tank in the following manner. When the color of the egg cluster turned from a light yellow to a slightly darker yellow, (approximately 5 days prior to the estimated hatching day), 375 g. of finely ground asari clam meat was supplied into the tank. Thereafter, until the larvae, metamorphosing through the zoea stage, reached the megalopa stage, 675 g. of finely ground asari clam meat, 95 g. of potassium nitrate (i.e., additive proportion of 50 percent of organic nitrogen and 50 percent of inorganic nitrogen), and 18 g. of potassium secondary phosphate were added daily to the water.

The culture water was not changed until the elapse of approximately 7 days after the larvae attained the adult bodily shape. Thereafter, approximately one fifth of the total water quantity was discharged daily and replaced by the same quantity of fresh water.

The propagation of the food organisms was similar to that described in Example 1. The crab larvae hatched 5 days after the start of supplying of the nutritive substances and immediately began to feed on the zooplankton such as copepoda. The larvae thus satisfactorily passed through eight days of the zoea stage and four days of the megalopa stage to metamorphose to the post larval stage. As a result, the number of infant crabs produced from a single tank one month after hatching was 122,700.

Zooplanktons such as copepoda which had propagated in the culture water were found to be ample as food for the larvae in the zoea stage. As food for the larvae in the megalopa stage and thereafter, 1.2 kg. of artemia dried eggs and 18.0 kg. of asari clam meat were supplied.

By one example of a known technique for raising gazami crab larvae, the zoea period lasts from 12 to 15 days and the megalopa period last from 5 to 7 days when ample artemia food is fed. It will be apparent, therefore, that by adding nutritive substances to the culture water to induce the propagation of live food organisms in accordance with the invention, it is possible to promote remarkably the development of the desired crab larvae.

Furthermore, since the larvae of the gazami crab are voraciously cannibalistic, it has heretofore been considered that quantity (mass) production of infant crabs is difficult. This experiment and related experiments, however, have definitely indicated the possibility of mass production of infant gazami crabs.

Example 4.

Raw sea water containing 120 mg. of inorganic nitrogen and 50 mg. of organic nitrogen per ton thereof was filtered through an 80-mesh synthetic fiber fabric to remove coarse solid particles and supplied to a depth of 1.5 m. in a water tank measuring 10 m. ×10 m. ×2 mm. depth and covered with translucent corrugated vinyl sheets so as to prevent introduction of rain water. A female Ise lobster (*Panulirus japonicus* VON SIEBOLD) which had spawned eggs and was carrying the eggs in a cluster against its abdominal region was placed in the tank.

Then, as air was bubbled through the tank water, cultivation of live food organisms and raising of the phyllosoma larvae of the Ise lobster were carried out simultaneously in the same tank in the following manner.

When the egg cluster exhibited a red color, 450 g. of squid soluble was first added to the culture water. Then, until phyllosoma larvae hatched, 135 g. of the same squid soluble, 142 g. of potassium nitrate (i.e., an additive proportion of 25 percent of organic nitrogen and 75 percent of inorganic nitrogen), and 18 g. of potassium secondary phosphate were supplied daily into the tank, approximately one fifth of the total culture water being changed each day.

The propagation of the food organisms such as diatoms and copepoda was similar to that in Example 1. When approximately 10 days had elapsed from the start of addition of the nutritive substances, a large number of cirripedia and polychaeta were adhering to the walls and bottom of the water tank and propagating with diatoms as food.

The phyllosoma larvae of the Ise lobster fed on freely floating larvae which hatched from the zooplankton such as the copepoda, the cirripedia, and polychaeta and, molting periodically, grew in a favorable manner. It was thus possible to raise the larvae through the sixth phyllosoma period.

To date, success in fully raising phyllosoma larvae of the Ise lobster has not yet been achieved, and for this reason there is a tendency of the cultivation of these larvae to become increasingly precise and of highly special nature. The results of the experiment of this example, however, have clearly illustrated that these phyllosoma larvae can be raised in a relatively simple manner.

As is apparent from the foregoing disclosure, the present invention provides a method of raising young crustacea in which zooplankton such as copepoda, free floating polychaeta (errantia) or adhering cirripedia and polychaeta (sedentaria) are caused to propagate in culture water with diatoms and protozoa as the basic foods to establish and maintain a stable food chain, whereby the control of cultivation of valuable crustacean larvae which are desired is made remarkably simple.

While the present invention has been described in the foregoing disclosure with respect to examples of preferred embodiment of the invention, and, moreover, with respect to certain specific species of coastal crustacea, it should be understood, of course, that various changes and modifications can be made in the details of the invention as herein set forth without departing from the spirit and scope of the invention and that the teachings of the invention can be applied to and profitably utilized in the artificial production of the young of coastal crustacea other than those specifically named herein, in not only Asiatic coastal regions but in also coastal regions in all parts of the earth.

I claim:

1. A method for producing the young of prawns of the "kuruma" prawn species which comprises putting parent prawns in a hatching and culturing tank filled with raw sea water or sea water similar thereto for spawning eggs thereof, adding a small amount of nitrogen and phosphorus to the culture tank water for a period until hatched nauplius develop to young prawns from the day before metamorphosing to the zoea state, at least for a period during which larvae metamorphose to post larvae from the zoea, thereby multiplying successively food organisms of vegetable plankton such as diatoms, animal plankton such as copepoda and bottom-living organisms in the culture water so as to meet the metamorphosis process of larvae which start taking said vegetable plankton such as diatoms, animal plankton such as copepoda and bottom-living organisms as food to meet a period during which larvae metamorphose and develop from the zoea stage, to the mysis stage, and to the final-stage larvae of the post larvae, and thereby carrying out both raising larvae of prawns and culturing food necessary therefor simultaneously in the same body of water.

2. A method for producing the young of crabs of the "-gazami" crab species, which comprises putting parent crabs holding eggs in a hatching and culturing tank filled with raw sea water or sea water similar thereto for maturing eggs, adding a small amount of nitrogen and phosphorus to the culture tank water for a period until hatched larvae develop to young crabs from the time the eggs change from light yellow to dark yellow, at least for a period said larvae metamorphose to the megalopa stage from the zoea stage for developing vegetable plankton such as diatoms in the culture water, thereby multiplying successively food organisms of animal plankton such as copepoda and bottom-living organisms in the culture water so as to meet the metamorphosis process of larvae which start taking said animal plankton and bottom-living organisms to meet a period during which larvae metamorphose from the zoea stage to the post larvae stage, and thereby carrying out both raising larvae of crabs and culturing food necessary therefor throughout the whole period from the initial raising stage simultaneously in the same body of water.

3. A method for producing the young of prawns of the "ise" prawn species which comprises putting parent prawns holding eggs in a hatching and raising tank filled with raw sea water or sea water similar thereto for maturing eggs, adding a small amount of nitrogen and phosphorous to the culture tank water starting from the time eggs change from yellow to red, thereby multiplying animal plankton such as copepoda in the culture water so as to meet the hatching of phyllosoma larvae, thereby establishing a stabilized food-chain of vegetable plankton such as diatoms, animal plankton such as copepoda and bottom-living organisms, and thereby carrying out both raising larvae of "ise" prawn and culturing foodstuffs necessary therefor throughout the whole period from the initial raising stage simultaneously in the same body of water.

4. A method for artificially producing the young of valuable coastal crustacea and raising the larvae for a period until they grow to the adult size and also culturing food required by the larvae for said period simultaneously and naturally in the same body of water, the steps comprising:

filling sea water in a hatching and culturing tank as a culture water;

putting crustacea containing culture water in said prefilled tank;

adding a predetermined amount of organic matter containing organic nitrogen compounds and a predetermined amount of phosphorous compound in the culture water;

carrying out the addition of said amounts at fixed rates and intervals, thereby successively multiplying various kinds of plankton and bottom-living animal larvae of the plankton-living type such as contained in said raw sea water, thus establishing in said culture water a stabilized food chain which comprises added nutrient matter, vegetable plankton such as free-floating diatoms, zooplankton such as copepoda, and bottom-living organisms, to cause a successive multiplication of live food organisms in accordance with the metamorphoses stages of larvae which start taking food represented by said organisms.

5. A method as claimed in claim 4, and adding an amount of organic matter containing inorganic nitrogen and inorganic compounds containing inorganic nitrogen.

6. A method for artificially producing the young of valuable coastal crustacea as claimed in claim 4 filtering said sea water which is used as the hatching and culturing water and contains vegetable plankton such as free-floating diatoms, copepoda, other animal plankton, and free-floating larvae of bottom living organisms, removing large-size marine-product animals which are able to eat said larvae but not filtering said sea water to the extent that it reaches a state similar to raw sea water.

7. A method for producing the young as claimed in claim 4, in which when the organic nitrogen content in natural sea water is 200 mg./ton or less as N, said organic nitrogen content is raised up to standard by adding organic matter containing organic nitrogen to the culture water, in advance, thereafter the adding quantity of nutrient salt is approximately 100–200 mg./ton (standard 180 mg./ton) as N, and 11–22 mg./ton (standard 20 mg./ton) as P per day, said quantities giving physiological influences injurious to larvae and imparting no deterioration to the state of the water, and the adding quantity of organic nitrogen is 50 percent or less of the total nitrogen quantity to be added.